United States Patent [19]

Usui et al.

[11] Patent Number: 5,113,653
[45] Date of Patent: May 19, 1992

[54] EXHAUST GAS CLEANING APPARATUS

[75] Inventors: Masayoshi Usui, Numazu; Haruo Serizawa, Shizuoka, both of Japan

[73] Assignee: Usui Kokusai Sangyo Kabushiki Kaisha, Shizuoka, Japan

[21] Appl. No.: 443,531

[22] Filed: Nov. 30, 1989

[30] Foreign Application Priority Data

Dec. 16, 1988 [JP] Japan .......................... 63-162401[U]

[51] Int. Cl.⁵ .................................................. F01N 3/28
[52] U.S. Cl. ....................................... 60/299; 422/171; 422/179; 422/180
[58] Field of Search ................... 60/299, 322; 422/180, 422/171, 179

[56] References Cited

U.S. PATENT DOCUMENTS

3,978,567  9/1976  Vroman ............................. 60/299
4,186,172  1/1980  Scholz ............................... 60/299
4,238,456  12/1980  Jabling .............................. 60/299
4,795,615  1/1989  Cyron et al. .

Primary Examiner—Douglas Hart
Attorney, Agent, or Firm—Lowe, Price, LeBlance & Becker

[57] ABSTRACT

In an exhaust gas cleaning apparatus, at least two honeycomb core bodies each as an exhaust gas cleaning catalyst are arranged, with at least one axial space therebetween, in a metal casing. Each core body is composed of a sheet-like band and a corrugated band. The outer peripheral surfaces of the core bodies are fixed to the inner surface of the casing so that each core body is expandable and contractible axially. The axial space effectively absorbs and relaxes the stress due to large thermal strains acting on the individual core bodies, thus causing an improved durability.

6 Claims, 2 Drawing Sheets

EXHAUST GAS CLEANING APPARATUS

BACKGROUND OF THE INVENTION

1. Field of the Invention

This invention relates an exhaust gas cleaning apparatus which is generally provided at a midpoint of an exhaust system of an automobile and which is composed of a metal-made honeycomb core body adapted for carrying thereon an exhaust gas cleaning catalyst and fitted in a tubular metal casing. More particularly, the invention relates to an exhaust gas cleaning apparatus in which the constituent members of the apparatus are joined with adequate strength so as to resist against separation, cracking and other breakage due to thermal strains.

2. Description of the Related Art

In conventional exhaust gas cleaning apparatuses of the mentioned type, a sheet-like band made of a heat-resistant thin metal sheet and a corrugated band made from another thin metal sheet of the same kind are superposed one over the other to have areas of contact therebetween. They are then rolled together spirally into a honeycomb form (hereinafter called "honeycomb core body") defining many network-patterned gas flow passages along the central axis thereof for allowing exhaust gas to pass therethrough. The honeycomb core body is enclosed by a tubular metal casing which has a single-layer body and opens at opposite ends thereof. The honeycomb core body and the tubular metal casing are firmly joined by brazing, for example, so as to resist against the stress due to thermal strains resulting from the high temperature of exhaust gas as well as the exothermic reaction between exhaust gas and the exhaust gas cleaning catalyst, and also so as to resist against the sever vibrations while the automobile is running. The members of the honeycomb core body, i.e., the sheet-like band and the corrugated band are joined together at the areas of contact therebetween by one of various known manner.

However, this conventional arrangement cannot remain useful for a long period of time. For example, large separation between the outermost peripheral surface of the honeycomb core body and the inner surface of the metal casing tend to occur, in the direction of the axis of the honeycomb core body (i.e., in the exhaust gas flowing direction), due to the stress resulting from thermal strains under the abovementioned severe thermal environments. Further, about the peripheral part (the outer peripheral surface and the portion immediately therein-side) of the honeycomb core body, the members (a sheet-like band and a corrugated band) of the honeycomb core body tend to be separated, cracked or otherwise broken to a large extent.

Attempts have been made to solve the foregoing problem, and it has been turned out that to merely join the honeycomb core body and the metal casing together firmly is not successful.

SUMMARY OF THE INVENTION

It is therefore an object of this invention to provide an exhaust gas cleaning apparatus in which separation between the outermost peripheral surface of a honeycomb core body and the inner surface of a tubular metal casing as well as cracking or other beakage can be prevented for a long period time without bringing these various parts in complete contact with one another.

According to this invention, there is provided an exhaust gas cleaning apparatus comprising: at least two honeycomb core bodies each adapted for carrying thereon an exhaust gas cleaning catalyst and composed of a sheet-like band made of a thin metal sheet and a corrugated band made from another thin metal sheet, the sheet-like band and the corrugated band being superposed one over the other so as to have areas of contact therebetween and so as to define many network-patterned gas flow passages along the central axis thereof; a metal casing opening at opposite ends, the honeycomb core bodies being inserted in and fixed to the metal casing with at least one axial space between the honeycomb core bodies; and an outer peripheral surface of each honeycomb core bodies and an inner surface of the metal casing being fixed at at least one part of areas of contact therebetween, except that both opposite end portions of the outer peripheral surface of each honeycomb core body are fixed to the inner surface of the metal casing. Since two or more honeycomb core bodies are arranged, with an axial space therebetween, in the metal casing, it is possible to most effectively disperse and relax the stress due to thermal strains, thus causing improved degree of exhaust gas cleaning capability.

The above and other objects, features and additional advantages of this invention will become manifest to those versed in the art upon making reference to the detailed description and the accompanying drawings in which a couple of preferred structural embodiments incorporating the principle of this invention are shown by way of illustrative example.

DETAILED DESCRIPTION

Figure 1:
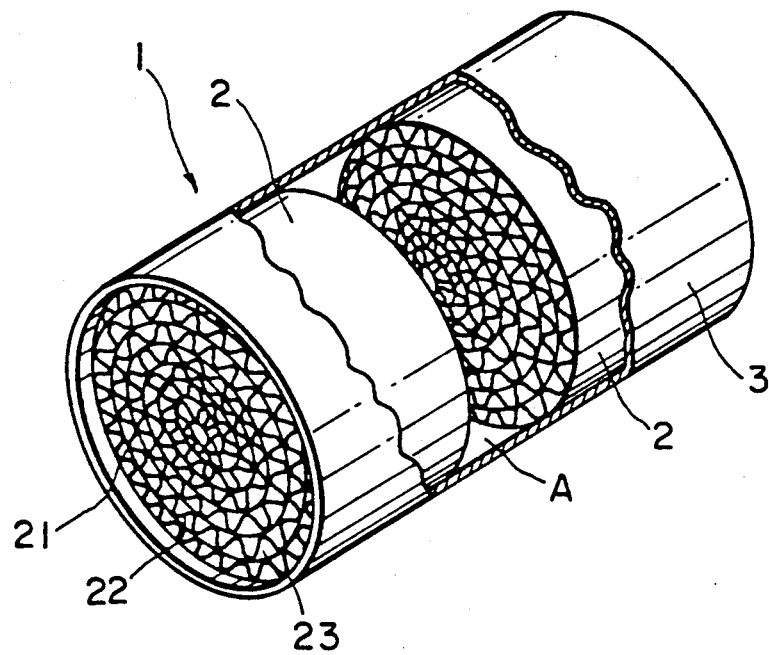
FIG. 1 is a perspective view, partially broken away, of an exhaust gas cleaning apparatus according to a first embodiment of this invention.

As discussed above, generally, in the manufacture of the conventional exhaust gas cleaning apparatus, a single honeycomb core body is inserted in a tubular metal casing opening at opposite ends, and then the outer peripheral surface of the honeycomb core body and the inner surface of the metal casing are fixed together firmly. However, such conventional cleaning apparatus could not be durable for long service.

Since exhaust gas cleaning apparatuses are to be used under severe thermal environments, the constituent members of the apparatus would be subjected to the large stress due to thermal strains, which is a primary cause to impair the durability.

Specifically, the constituent members of an exhaust gas cleaning apparatus are subjected to a large stress due to thermal strains resulting from the heat alternating load, i.e., the heating and cooling cycle (the cycle within the temperature range of from −20 to 900° C. at an exhaust system) depending upon whether the engine of an automobile is in operation or is stopped, whether the load is large or small, and so forth.

Also during the automobile is running, an exhaust gas cleaning apparatus is subjected to a large stress due to thermal strains. Partly due to the difference in distribution of exhaust gas flow (more flow at the central part than at the peripheral part), and partly due to the contact reaction (exothermic reaction) between exhaust gas and an exhaust gas cleaning catalyst (e.g., platinum, palladium. rhodium) carried on the surfaces of the honeycomb core body, the central part of the honeycomb core body is subjected to higher temperature than the peripheral part, which would be a cause for the thermal strains.

Further, the temperature gradient between the outermost peripheral surface of the honeycomb core body and the next outer portion inwardly contiguous thereto is remarkably large, compared to the temperature gradient around the central part. This tendency to separate is accelerated more and more as the honeycomb core body is fixed in the metal casing exposed to the outside air.

Resulting from this, the honeycomb core body and the metal casing tend to be separated along with time lapsing, even though the outermost peripheral surface of the honeycomb core body is fixed to the inner surface of the metal casing by brazing.

Likewise, by the stress due to the thermal strains, separation at the areas of contact between the sheet-like and corrugated bands making up the honeycomb core body tends to occur at the peripheral part between the outermost peripheral surface (of the honeycomb core body) brazed to the inner surface of the metal casing and the next outer portion contiguous thereto. When this separation begins, the members of the honeycomb core body, i.e., the sheet-like and corrugated bands would be cracked or otherwise broken as vibrations from the internal engine or the automobile body are added.

In order to retard or prevent this separation phenomenon, it is necessary to adopt some measure to relax the stress due to thermal strains at the outer peripheral part of the honeycomb core body.

For this purpose, in the exhaust gas cleaning apparatus of this invention, at least two honeycomb core bodies are arranged, with at least one space of a desired width therebetween, in a single metal casing. This invention also adopt the technical concept of fixing the outer peripheral surface of each honeycomb core body to the inner surface of the metal casing at at least one part of the areas of contact therebetween, except that both opposite end portions of the outer peripheral surface of each honeycomb core body are fixed to the inner surface of the metal casing.

In this invention, it is essential to fix the outer peripheral surface of each honeycomb core body at least one portion, with the above-discussed exception. Here, the wording "at least one portion" means "a part of the entire axial region, such as the central part of each honeycomb core body and/or the marginal part adjacent to the inter-body space, as viewed axially of the outer peripheral surface of the honeycomb core body". More specifically, a part of the outer peripheral surface of the individual honeycomb core body, e.g., the honeycomb core body is fixed to the inner surface of the metal casing annularly along the entire circumference, with the remaining circumferential region being disposed merely against (simply contacting without fixing by brazing, for example) with the inner surface of the metal casing. With this unique structural features of this invention, the non-fixed parts of the individual honeycomb core bodies are expandable and contractible axially.

Hypothetically, if both the opposite end portions of the outer peripheral surface of the honeycomb core body were fixed to the inner surface of the metal casing, it would not have been possible to effectively disperse and relax the large stress due to thermal strains creating on and about the outer peripheral surface of the honeycomb core body. As a consequence, this invention excludes this hypothetical embodiment. Apart from the excluded one, any one of various known methods may be adopted to perform the fixing between the individual honeycomb core bodies and the metal casing; for example, fixing may be made successively or continuously around the outer peripheral surface of the individual honeycomb core body.

To sum up, according to the exhaust gas cleaning apparatus of this invention, partly because at least two honeycomb core bodies are arranged, with at least one axial space of a predetermined width, in the metal casing, and partly because the individual honeycomb core body is fixed to the inner surface of the metal casing at at least one part of the entire peripheral surface of the honeycomb core body as viewed in the axial direction, except that both the opposite end portions of the outer peripheral surface of each honeycomb core body is fixed to the inner surface of the metal casing, it is possible to offer the following advantageous results:

(i) Partly since a part of the outer peripheral surface of each honeycomb core body is fixed to the metal casing with the remaining part (region) of the same outer peripheral surface being simply disposed against the inner surface of the metal casing, and partly since there is provided an axial space between the honeycomb core bodies, it is possible to effectively absorb the axial thermal strains. Thus it is possible to prevent separation between the individual honeycomb core body and the metal casing and between the sheet-like band the corrugated band of the individual honeycomb core body especially near the peripheral part thereof upon which the thermal strains may concentrate.

(ii) Having the axial space between the adjacent honeycomb core bodies, it is possible to stirred exhaust gas to create a turbulent flow, and therefore the exhaust gas passing through the axial space can be cleaned uniformly.

(iii) For the same reason discussed at (ii) above, uniform distribution of temperature in the apparatus; that is, it is possible to disperse the thermal strains, thus improving the durability of the cleaning apparatus.

(iv) Since a plurality of honeycomb core bodies are used, it is possible to assign various works, such as oxidizing HC and CO to $H_2O$ and $CO_2$ to thus make HC and CO harmless, reducing $NO_x$ to $N_2$ to thus make it harmless, and reaction making CO, $H_2O$ and $NO_x$ harmless concurrently, to the respective honeycomb core bodies.

This invention will now be described in greater detail by the following embodiments with reference to the accompanying drawings; however, this invention should by no means be limited to these specific examples.

Figure 2:
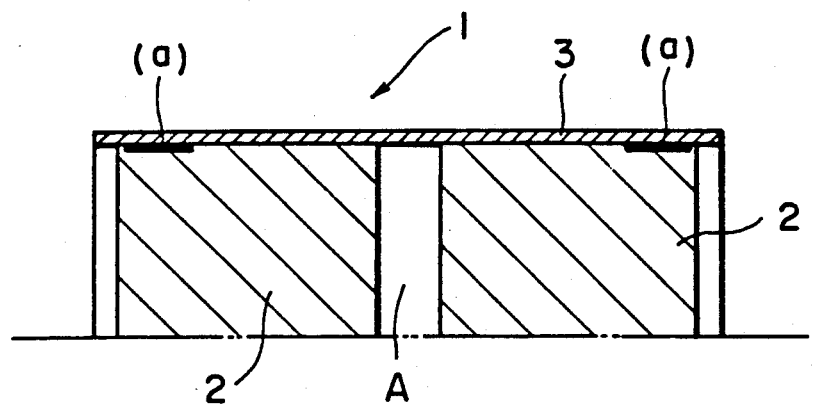
FIG. 2 is a fragmentary longitudinal cross-sectional view of the apparatus of FIG. 1.

FIGS. 1 and 2 illustrate an exhaust gas cleaning apparatus according to a first embodiment of this invention; FIG. 1 is a perspective view, partially broken away, of the cleaning apparatus, and FIG. 2 is a fragmentary longitudinal cross-sectional view of the cleaning apparatus.

In the manufacture of the exhaust gas cleaning apparatus 1 of this invention, two honeycomb core bodies 2, 2 are arranged, with an axial space A of a predetermined width, in a tubular metal casing 3 opening at opposite ends, and then each of the honeycomb core bodies 2 is fixed to the metal casing 3. When fixing each honeycomb core body 2 to the metal casing 3, the individual honeycomb core body 2 is fixed to the inner surface of the metal casing 3 by brazing, at an axial part a of the outer peripheral surface (of the individual honeycomb core body 2) near one of the opposite open ends of the metal casing 3, preferably annularly around the entire circumference of the honeycomb core body 2, while the other part of the outer peripheral surface near the axial space A is merely disposed against the inner surface of the metal casing 3, so that the individual core bodies 2 is expandable and contractible axially.

The individual honeycomb core body 2 is formed by superposing a sheet-like band 21, made of a heat-resistant thin steel sheet, and a corrugated band 22, made from another thin steel sheet of the same kind, one over the other so as to have areas of contact therebetween and then by rolling these two members together in a spiral form. Thus the honeycomb core body 2 has been formed to define many network-patterned gas flow passages 23.

A heat-resistant steel sheet containing 20% by weight of chromium and 5% by weight of aluminum and having a thickness of 0.04 mm and a width of 30 mm is used as a sheet-like band 21. Another steel sheet of the same kind as the sheet-like band 11 is shaped in a wavy form, and the resulting wavy sheet is used as a corrugated band 12. In this embodiment, two honeycomb core bodies 2, 2 having a reduced axial length were used.

Figure 3:
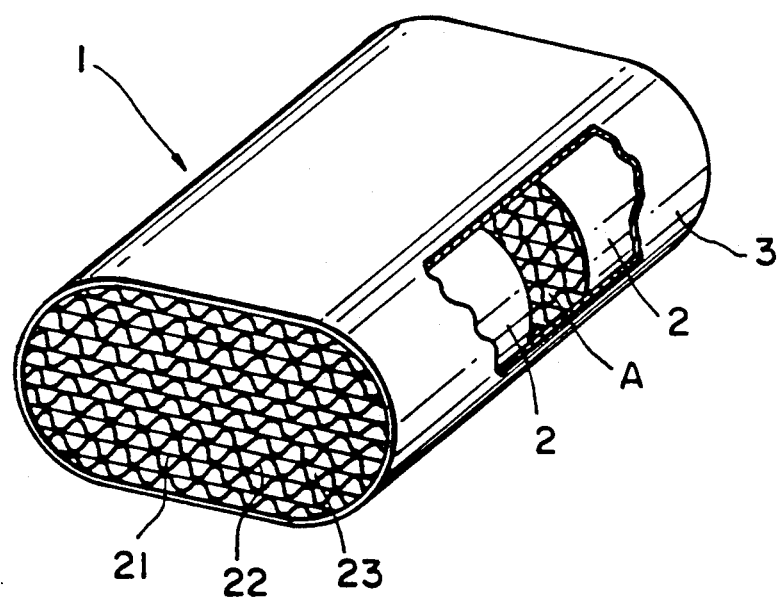
FIG. 3 is a view similar to FIG. 1, showing a modified cleaning apparatus according to a second embodiment.

FIG. 3 illustrates a modified exhaust gas cleaning apparatus according to a second embodiment of this invention. In this modified cleaning apparatus, unlike the first embodiment, the sheet-like band 21 and the corrugated band 22 of the honeycomb core body 2 are laminated in layers, and the metal casing 3 has a racing-track-shaped cross section.

What is claimed is:

1. An exhaust gas cleaning apparatus comprising:
   two honeycomb core bodies arranged in flow series and adapted for carrying thereon an exhaust gas cleaning catalyst each of said two honeycomb core bodies having an outer peripheral surface and each of said two honeycomb core bodies being composed of a sheet-like band made of a thin metal sheet and a corrugated band made from another thin metal sheet, said sheet-like band and said corrugated band being superposed one over the other so as to have areas of contact therebetween and so as to define many network-patterned gas flow passages along the central axis thereof;
   a metal casing having two opposite ends and being opened at said two opposite ends, said two honeycomb core bodies being inserted in and fixed to said metal casing with an axial space provided between said two honeycomb core bodies; and
   said outer peripheral surfaces of each of said two honeycomb core bodies and an inner surface of said metal casing being fixed together only at both opposite ends of said metal casing continuously around the entire circumference of said outer peripheral surfaces of each of said two honeycomb core bodies, so as to permit thermal expansion of said honeycomb core bodies in said axial space.

2. An exhaust gas cleaning apparatus according to claim 1, wherein said two honeycomb core bodies are disposed, with a desired width of axial space therebetween, in said metal casing, each of said honeycomb core bodies being fixed to said inner surface of said metal casing only at a marginal part of said outer peripheral surface which part is disposed adjacent to a respective one of said opposite open ends of said metal casing.

3. An exhaust gas cleaning apparatus according to claim 1, wherein said sheet-like band and said corrugated band of each said honeycomb core body are rolled together in a spiral form.

4. An exhaust gas cleaning apparatus according to claim 3, wherein said sheet-like band and said corrugated band of each said honeycomb core body are laminated in layers.

5. An exhaust gas cleaning apparatus according to claim 3, wherein said metal casing has a circular cross section.

6. An exhaust gas cleaning apparatus according to claim 3, wherein said metal casing has a racing-track-shaped cross section.

* * * * *